US008988395B2

(12) United States Patent
Soo et al.

(10) Patent No.: US 8,988,395 B2
(45) Date of Patent: Mar. 24, 2015

(54) TRACKING APPROACHING OR HOVERING OBJECTS FOR USER-INTERFACES

(71) Applicant: AT&T Intellectual Property I, LP, Atlanta, GA (US)

(72) Inventors: Armstrong Soo, San Ramon, CA (US); Bernard Ku, Austin, TX (US); Jeffrey Brandt, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/064,718

(22) Filed: Oct. 28, 2013

(65) Prior Publication Data
US 2014/0049517 A1 Feb. 20, 2014

Related U.S. Application Data

(63) Continuation of application No. 13/555,806, filed on Jul. 23, 2012, now Pat. No. 8,599,173, which is a continuation of application No. 12/256,818, filed on Oct. 23, 2008, now Pat. No. 8,253,713.

(51) Int. Cl.
*G06F 3/042* (2006.01)
*G06F 3/046* (2006.01)
*G06F 3/041* (2006.01)

(52) U.S. Cl.
CPC .............. *G06F 3/046* (2013.01); *G06F 3/0416* (2013.01); *G06F 3/042* (2013.01); *G06F 2203/04101* (2013.01); *G06F 2203/04106* (2013.01)
USPC ......... 345/175; 345/165; 345/166; 178/18.01

(58) Field of Classification Search
CPC ......... G06F 3/016; G06F 3/011; G06F 3/038; G06F 3/03333; G06F 3/03313; G06F 3/04865; G06F 3/0487; G06F 3/044; G06F 3/04875; G06F 3/045
USPC .......................... 345/156, 165–166, 173–179; 178/18.01–18.04
See application file for complete search history.

(56) References Cited

U.S. PATENT DOCUMENTS 6,073,036 A 6/2000 Heikkinen et al.
7,006,080 B2 2/2006 Gettemy et al.
(Continued)

OTHER PUBLICATIONS

Office Action dated Jun. 3, 2011 for PCT U.S. Appl. No. 12/249,064, 20 pages.
(Continued)

*Primary Examiner* — Kimnhung Nguyen
(74) *Attorney, Agent, or Firm* — Amin, Turocy & Watson, LLP

(57) ABSTRACT

An architecture is described that can utilize photo-sensors embedded in a substantially transparent layer of a UI display for tracking objects that approach or hover over the UI display. The photo-sensors can be configured to detect light of certain wavelengths (e.g., visible light, infrared light) that are propagated toward the UI display, while ignoring light emanating from the UI display when displaying content. Accordingly, by examining various characteristics of the incoming light such as intensity, the architecture can identify a location of a shadow incident upon the display caused by an approaching or hovering selector object blocking portions of incoming light. Additionally or alternatively, the architecture can identify a location of higher intensity for light emanating from the selector object.

20 Claims, 11 Drawing Sheets

(56) References Cited

U.S. PATENT DOCUMENTS

| | | |
|---|---|---|
| 7,760,187 B2 | 7/2010 | Kennedy et al. |
| 7,783,983 B1 | 8/2010 | Mayers et al. |
| 7,786,980 B2 | 8/2010 | Lashina et al. |
| 7,884,809 B2 | 2/2011 | Fabre et al. |
| 7,890,257 B2 | 2/2011 | Fyke et al. |
| 2001/0030642 A1 | 10/2001 | Sullivan et al. |
| 2002/0152255 A1 | 10/2002 | Smith et al. |
| 2006/0022955 A1 | 2/2006 | Kennedy et al. |
| 2006/0132460 A1 | 6/2006 | Kolmykov-Zotov et al. |
| 2006/0161870 A1 | 7/2006 | Hotelling et al. |
| 2006/0161871 A1 | 7/2006 | Hotelling et al. |
| 2008/0077871 A1 | 3/2008 | Baar et al. |
| 2008/0088599 A1 | 4/2008 | Gunn et al. |
| 2008/0106517 A1 | 5/2008 | Kerr et al. |
| 2008/0198138 A1 | 8/2008 | McFarlane et al. |
| 2008/0288895 A1 | 11/2008 | Hollemans et al. |
| 2009/0021492 A1 | 1/2009 | Wu et al. |
| 2009/0027418 A1 | 1/2009 | Maru et al. |
| 2009/0172606 A1 | 7/2009 | Dunn et al. |
| 2009/0213084 A1 | 8/2009 | Kramer et al. |
| 2009/0225040 A1 | 9/2009 | Whytock et al. |
| 2009/0237361 A1 | 9/2009 | Mosby et al. |
| 2009/0251422 A1 | 10/2009 | Wu et al. |
| 2009/0276734 A1 | 11/2009 | Taylor et al. |
| 2010/0001978 A1 | 1/2010 | Lynch et al. |
| 2010/0026723 A1 | 2/2010 | Nishihara et al. |
| 2010/0199232 A1 | 8/2010 | Mistry et al. |

OTHER PUBLICATIONS

Apple Insider "Inside Apple's latest iPod touch-screen patent filing", http//www.appleinsider.com/articles/06/07/20/inside_apples_latest_ipod_touch_screen_patent_filing.Html.

Office Action dated Nov. 10, 2011 for PCT U.S. Appl. No. 12/249,264, 23 pages.

Office Action dated Jan. 24, 2012 for U.S. Appl. No. 12/256,818, 22 pages.

Notice of Allowance dated Apr. 20, 2012 for U.S. Appl. No. 12/249,064.

Office Action dated Apr. 25, 2013 for U.S. Appl. No. 13/555,806, 20 pages.

Office Action dated Aug. 7, 2013 for U.S. Appl. No. 13/543,479, 47 pages.

TRACKING APPROACHING OR HOVERING OBJECTS FOR USER-INTERFACES

CROSS-REFERENCE TO RELATED APPLICATIONS

This application is a continuation of U.S. patent application Ser. No. 13/555,806 filed on Jul. 23, 2012 entitled, "TRACKING APPROACHING OR HOVERING OBJECTS FOR USER-INTERFACES," which is a continuation of U.S. Pat. No. 8,253,713 filed on Oct. 23, 2008 entitled, "TRACKING APPROACHING OR HOVERING OBJECTS FOR USER-INTERFACES." The entireties of these applications are incorporated herein by reference.

TECHNICAL FIELD

The present application relates generally to employing photo-sensing techniques with a user-interface (UI), and more specifically to utilizing photo-sensing for detecting a position of a physical object that approaches or hovers over a UI display.

BACKGROUND

The consumer and commercial markets for mobile devices (or other devices of limited size or form factor) such as cellular phones, digital media players, Personal Digital Assistants (PDAs) and similar devices is rapidly growing and has been gaining momentum for some time. Advances in chip technology, ergonomics, user interface (UI) technology, software applications, and the like often spur additional growth potential for many of these devices. Accordingly, many mobile devices are becoming more powerful, capable of delivering increasing functionality, while at the same time becoming less expensive, more compact, and more convenient to operate and carry.

As a result, mobile device or other devices of limited form factor have the potential to deliver a great deal of computational power. However, such devices also often underscore some of the fundamental challenges associated with the various limitations of these devices, such as small screen size, limited keyboard, short battery life, complex operation and/or high prices due to the need to embed UI components in such a small form factor. These and other limitations can substantially hinder the utility and proliferation of some mobile devices.

In accordance therewith, the consumer and commercial markets for these mobile devices are faced with difficulties in which current trends in the area do not appear adequate to solve. In particular, users of most mobile devices desire simpler, smaller, less expensive hardware, but on the other hand users also desire mobile devices that can provide a richer set of functionality, yet remain simple to use. Miniaturization of electronic devices has reached the point where significant computing power can be delivered in devices smaller than a matchbook. Hence, miniaturization is no longer the primary technological bottleneck for meeting the demands of consumers. Rather, the challenges are increasingly leaning toward the user interface of such devices.

For example, technology exists for building a full-featured cellular phone (or other device) that is no larger than a given user's thumb, yet packing a display, keyboard, and other UI features in such a small area is all but impossible. Even devices that that have opted to forego keyboards in favor of touch-screen I/O present numerous challenges for the implementation of a successful UI.

DETAILED DESCRIPTION

Figure 1:
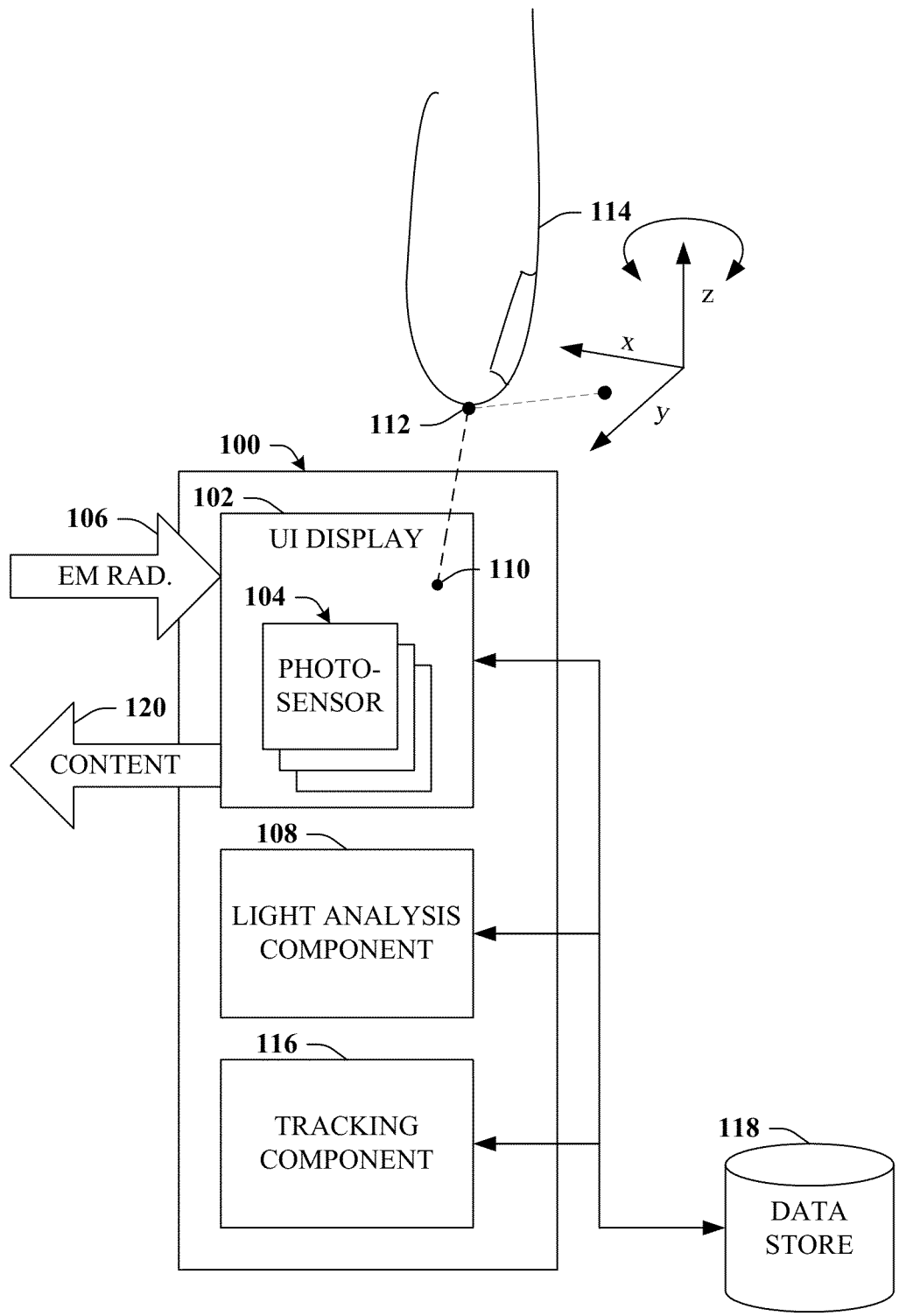
FIG. 1 is a block diagram of a system that can utilize photo-sensors to track objects that approach or hover over a user-interface (UI) display.

The subject matter disclosed and claimed herein, in one aspect thereof, comprises an architecture that can utilize photo-sensors to track objects that approach or hover over a user-interface (UI) display surface. In accordance therewith and to other related ends, the architecture can include a set or array of photo-sensors that detect electromagnetic radiation (e.g., light). The array of photo-sensors can be included in one or more transparent layer that is embedded in a UI display. Each of the photo-sensors can measure certain characteristics of incoming light, while ignoring light emanating from the display. For example, the photo-sensors can measure an intensity of the incoming light. In some cases, the photo-sensors can also provide data relating to an angle of incident for the incoming light.

The architecture can further include a light analysis component that can identify a coordinate on the UI display that relates to a position of a selector object approaching, tracking along, or hovering over the UI display. Based upon data received from the array of photo-sensors, the light analysis component can select the coordinate. Accordingly, the coordinate can be determined to represent a location on the UI display that corresponds to a present position of the selector object. For example, the coordinate can represent the location on the UI display that is directly beneath the selector object.

The coordinate can be determined based upon detection of a shadow produced by the selector object as it obstructs incoming light. Additionally or alternatively, the coordinate can determined based upon light (e.g., infrared light) that emanates from the selector object. It is also possible to interpolate data relating to both a shadow and the light emanating from the selector object to refine or increase the accuracy of the coordinate.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", or the like can refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawing, with reference initially to FIG. 1, system 100 that can utilize photo-sensors to track objects that approach, track across, or hover over a user-interface (UI) display is depicted. Generally, system 100 can comprise UI display 102 that can include a set of photo-sensors 104 capable of detecting various aspects of electromagnetic radiation 106, or light. Appreciably, the terms "electromagnetic radiation" and "light" are used herein substantially interchangeably.

UI display 102 can be any suitable display device or surface that can present visual content, such as content 120. More specifically, UI display 102 can be operatively coupled to and/or included with a communication device (not shown), thereby operating as a UI feature of the host communication device (e.g., a display/touch screen). The associated communication device can be any suitable device, but will often be one of limited form factor such as a cellular or smart phone (or other device), a media player, or a Personal Digital Assistant (PDA) or the like. Furthermore, it should be appreciated that UI display 102 can be a touch-sensitive display that can accept an input based upon contact with a surface of UI display 108.

In an aspect of the claimed subject matter, electromagnetic radiation 106 can be light in the visible spectrum or that which, on average, can be perceived by the human eye. Visible light typically has wavelength characteristics that range between approximately 300 nanometers and 800 nanometers. Additionally or alternatively, electromagnetic radiation 106 can be infrared radiation. The infrared spectrum is generally considered to include light of wavelengths in a range between about 800 nanometers to about 1 millimeter. Accordingly, photo-sensors 104 can be specifically tailored or configured to recognize or react to light in the visible and infrared spectrums.

In addition, system 100 can also include light analysis component 108 that can determine or identify coordinate 110. Coordinate 110 can be a pixel or other point mapped to a display portion of UI display 102 that relates to position 112 of selector object 114. Position 112 is typically a salient point or feature of selector object 114, or the nearest portion of selector object 114 to UI display 102.

As depicted, selector object 114 can be a finger or thumb of an operator or user of the communication device associated with UI display 102. In addition, selector object 114 can also be a stylus or another physical object suitable for tactile-based I/O. Appreciably, selector object 114 can include a transmitter or other signaling hardware or special purpose material to aid in position tracking, however, such need not necessarily be the case. Position 112 can include x-y values for a coordinate plane that is substantially parallel to a surface of UI display 102. In addition, position 112 can also include a distance (e.g., a z value for the coordinate space) between selector object 114 and UI display 102, which is further discussed in connection with FIGS. 2 and 4. Accordingly, coordinate 110 can be described as the point or pixel over which selector object 114 is hovering as determined by light analysis component 108. In particular, light analysis component 108 can determine coordinate 110 based upon position 112 of selector object 114 by examining data received from the set of photo-sensors 104. Additional detail regarding photo-sensors 104 is provided in connection with FIG. 2.

Figure 2:
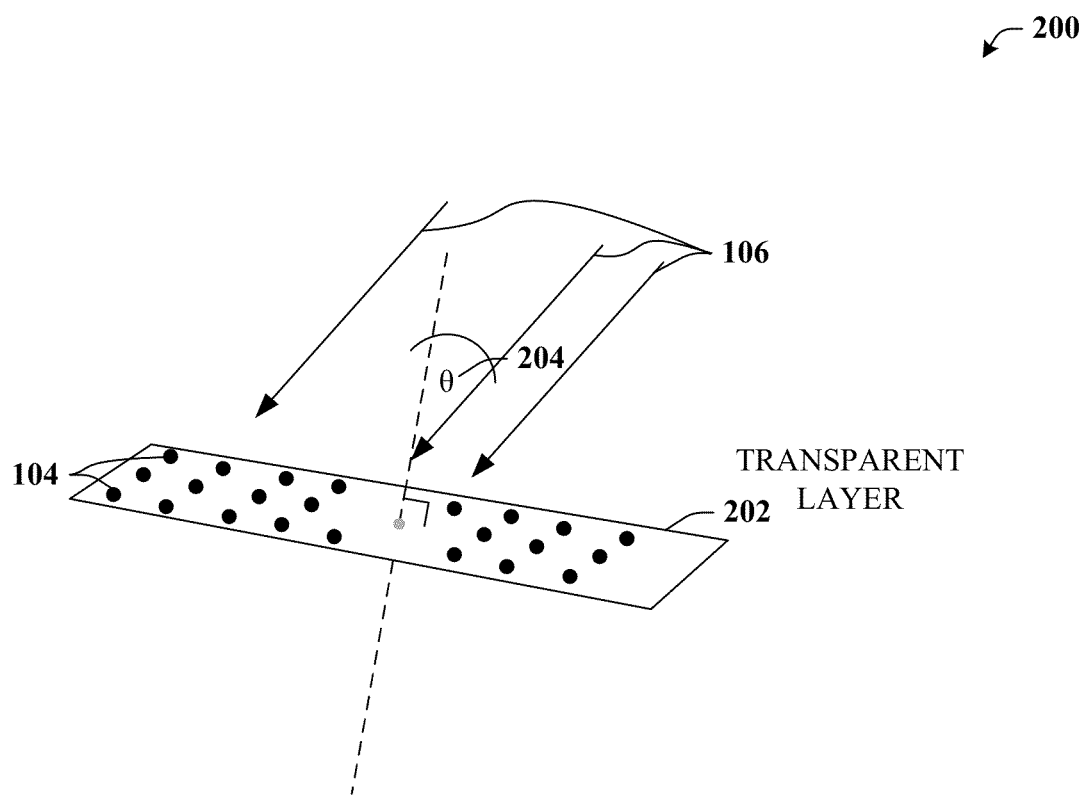
FIG. 2 depicts a diagram that provides an example illustration of the set of photo-sensors in a layer.
Figure 3:
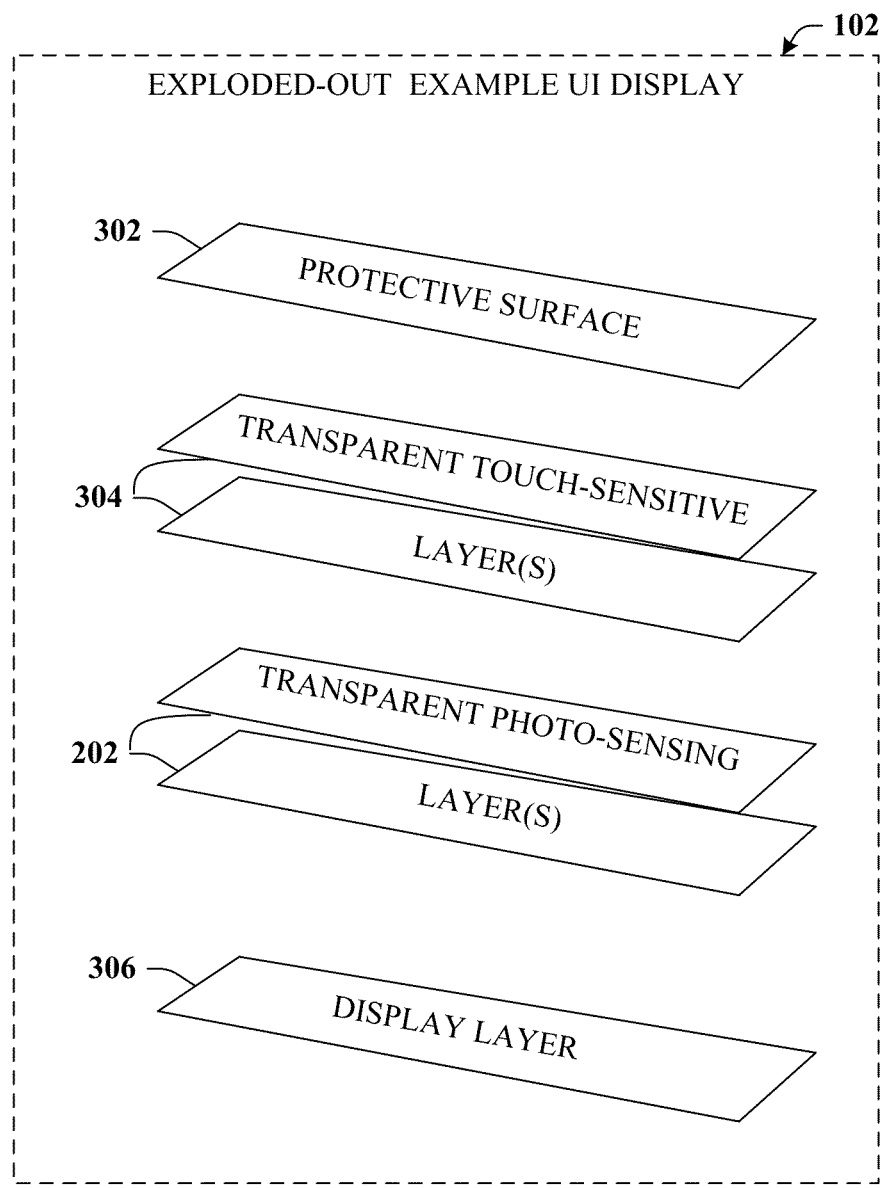
FIG. 3 provides a block diagram illustration that depicts an example composition of UI display 102 that is exploded out for clarity.

While still referring to FIG. 1, but turning now also to FIGS. 2 and 3. FIG. 2 provides example illustration 200 of the set of photo-sensors. FIG. 3 depicts an example composition of UI display 102 that is exploded out for the sake of clarity. According to illustration 200, photo-sensors 104 can be arranged along one or more sheet or layer 202 that is approximately the same size and shape as a functional portion of UI display 102. Thus, layer 202 can be conveniently included in the structure of UI display 102. Moreover, Layer(s) 202 can be substantially transparent such that content 120 presented by UI display 102 can be provided without occlusion or distortion.

In regards to illustration 200, each photo-sensor 104 can be configured to measure an intensity of electromagnetic radiation 106. A common property of photo-sensors (e.g., photo-sensors 104) is that electrical conductance varies depending on the intensity of radiation (e.g., electromagnetic radiation 106) striking the photo-sensor, however intensity can be determined by some other means. As used herein, intensity is intended to refer to time-averaged energy flux associated with electromagnetic radiation 106, however, in some cases, intensity can refer to the strength or level of electromagnetic radiation 106. Additionally or alternatively, each photo-sensor 104 can measure energy density (e.g., energy per area) for incoming electromagnetic radiation 106. In accordance therewith, it should be readily appreciated that light analysis component 108, by examining data from photo-sensors 104 distributed at known locations along layer 202, can be capable of distinguishing portions of layer 202 that are shaded relative to other un-shaded or less-shaded regions.

Hence, a shadow cast by selector object 114 upon the UI display 102, or some other light-based characteristic, can be detected by photo-sensors 104, and the location of the shadow can be identified. Light analysis component 108 can further determine position 112 in relation to the location of the shadow by calculating one or more incident angle 204 (one for each axis or dimension) of the incoming electromagnetic radiation 106. For example, incident angle 204 can represent the angle between an electromagnetic radiation 106 ray incident upon the surface of layer 202 and the line perpendicular to the surface at the point of incidence. The incident angle(s) 204 (e.g., for x- and y-axes parameters) can be determined by, e.g., employing multiple layers 202 and measuring the offset characteristics between each layer 202 for the incoming electromagnetic radiation 106; or by another suitable means. The distance between layer 202 and selector object 114 (e.g., z-axis parameter) can be determined or inferred based upon a size of the associated shadow; or by another suitable means. Regardless, once determined or received, the z-axis parameter can be employed to establish a distance between position 112 and coordinate 110.

Furthermore, based upon the aforementioned calculations or inferences, light analysis component 108 can establish coordinate 110, which can be a location on UI display 102 that is directly below position 112 of a hovering or approaching selector object 114. Alternatively, in a more basic approach, light analysis component 108 can simply identify an area that is shaded (or another light-based characteristic) and assign coordinate 110 to the center of that area. Appreciably, in this latter case, the offset between the shadow and a perpendicular axis between layer 202 and selector object 114 is effectively ignored. However, for many applications this offset can be negligible unless incoming electromagnetic radiation 106 intersects layer 202 at a relatively acute angle. It should be understood that photo-sensors 104 can be configured to measure intensity of electromagnetic radiation 106 that is propagated substantially toward UI display 102, while ignoring electromagnetic radiation 106 emitted by UI display 102. Accordingly, content 120 or other radiation emissions generated by UI display 102 need not interfere with the analysis or determinations of light analysis component 108.

Referring again to the exploded-out example structure for UI display 102 of FIG. 3, as depicted, the top layer can be protective surface 302. Protective surface 302 can shield other components of UI display from fingerprints, dirt, or other soiling and can mitigate shock or wear from impacts or normal use. In addition, example UI display 102 can include one or more substantially transparent touch-sensitive layer 304. Substantially any type of touch-sensitive technology can be employed, including multi-touch technologies and techniques that can distinguish pressure (e.g., how hard a portion of the surface is pressed).

Next, UI display 102 can, of course, also include one or more photo-sensing layer 202 that includes the set or array of photo-sensors 104. Appreciably, each photo-sensing layer 202 need not necessarily be adjacent to another photo-sensing layer 202 as illustrated. Rather, other layers of the example UI display 102 can reside between disparate photo-sensing layers 202. For example, one photo-sensing layer 202 can be above the touch-sensitive layer(s) 304, while another photo-sensing layer 202 is beneath. Generally, display layer 306 that presents content 120 will reside at the bottom layer.

Continuing the discussion of FIG. 1, system 100 can also include tracking component 116 that can monitor position 112 of selector object 114 relative to UI display 102. Additionally or alternatively, tracking component 116 can monitor coordinate 110 as determined by light analysis component 108 based upon the location of selector object 114. By monitoring one or both position 112 or coordinate 110, tracking component can facilitate various updates or augmentations relating to content 120 presented by UI display 102. For example, a virtual magnifying glass or another change in pixel characteristics can be facilitated at or around coordinate 110, as detailed herein by subject matter incorporated by reference.

Furthermore system 100 can also include or be operatively connected to data store 118. Data store 118 is intended to be a repository of all or portions of data, data sets, or information described herein or otherwise suitable for use with the claimed subject matter. Data store 118 can be centralized, either remotely or locally cached, or distributed, potentially across multiple devices and/or schemas. Furthermore, data store 118 can be embodied as substantially any type of memory, including but not limited to volatile or non-volatile, sequential access, structured access, or random access and so on. It should be understood that all or portions of data store 118 can be included in system 100, or can reside in part or entirely remotely from system 100.

Figure 4:
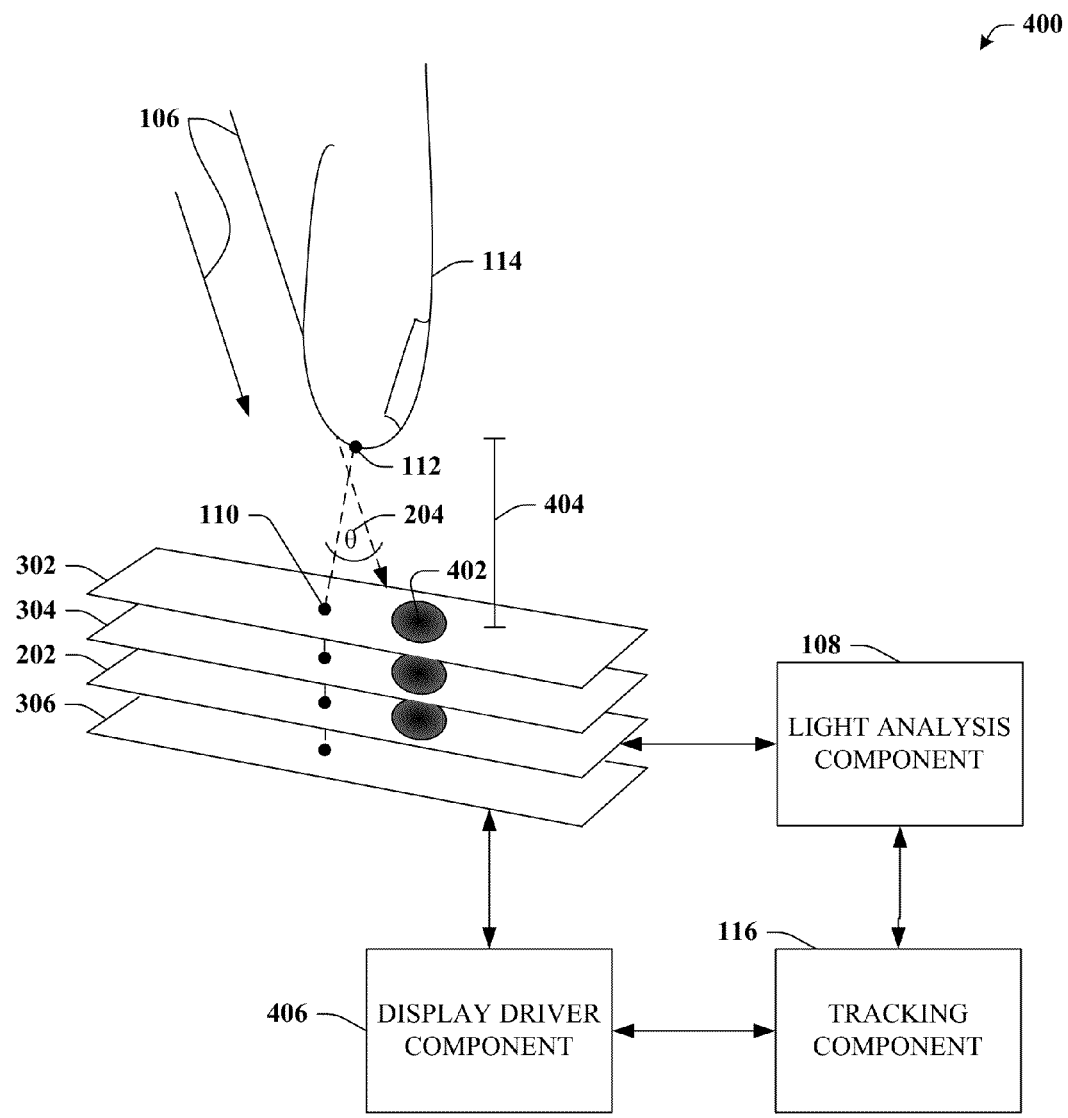
FIG. 4 depicts a block diagram of a system that can employ photo-sensors to detect a shadow of a selector object cast upon a UI display.

Turning now to FIG. 4, system 400 that can employ photo-sensors to detect a shadow of a selector object cast upon a UI display is provided. In general, system 400 can include light analysis component 108 that can identify coordinate 110 on a UI display. The UI display can be constructed to comprise a number of layers, such as protective layer 302, touch-sensitive layer 304, photo-sensing layer 202 and display layer 306. All or a subset of these or other included layers can be transparent. Hence, light 106 or characteristics of light 106 can be available to all layers and content 120 output from display layer 306 can be unobstructed.

Coordinate 110 can relate to position 112 of selector object 114, which can represent a location of the UI display over which selector object 114 resides at a particular moment. Light analysis component 108 can identify coordinate 110 based upon data received from the set of photo-sensors 104 that can be arranged in photo-sensing layer 202. In particular, photo-sensors 104 can measure the intensity of the incoming light 306. By comparing the intensity measured by various photo-sensors 104 dispersed throughout the photo-sensing layer 202, light analysis component 108 can determine a location of shadow 402 on a surface of the UI display, as well as the central point or portion of shadow 402.

Figure 5:
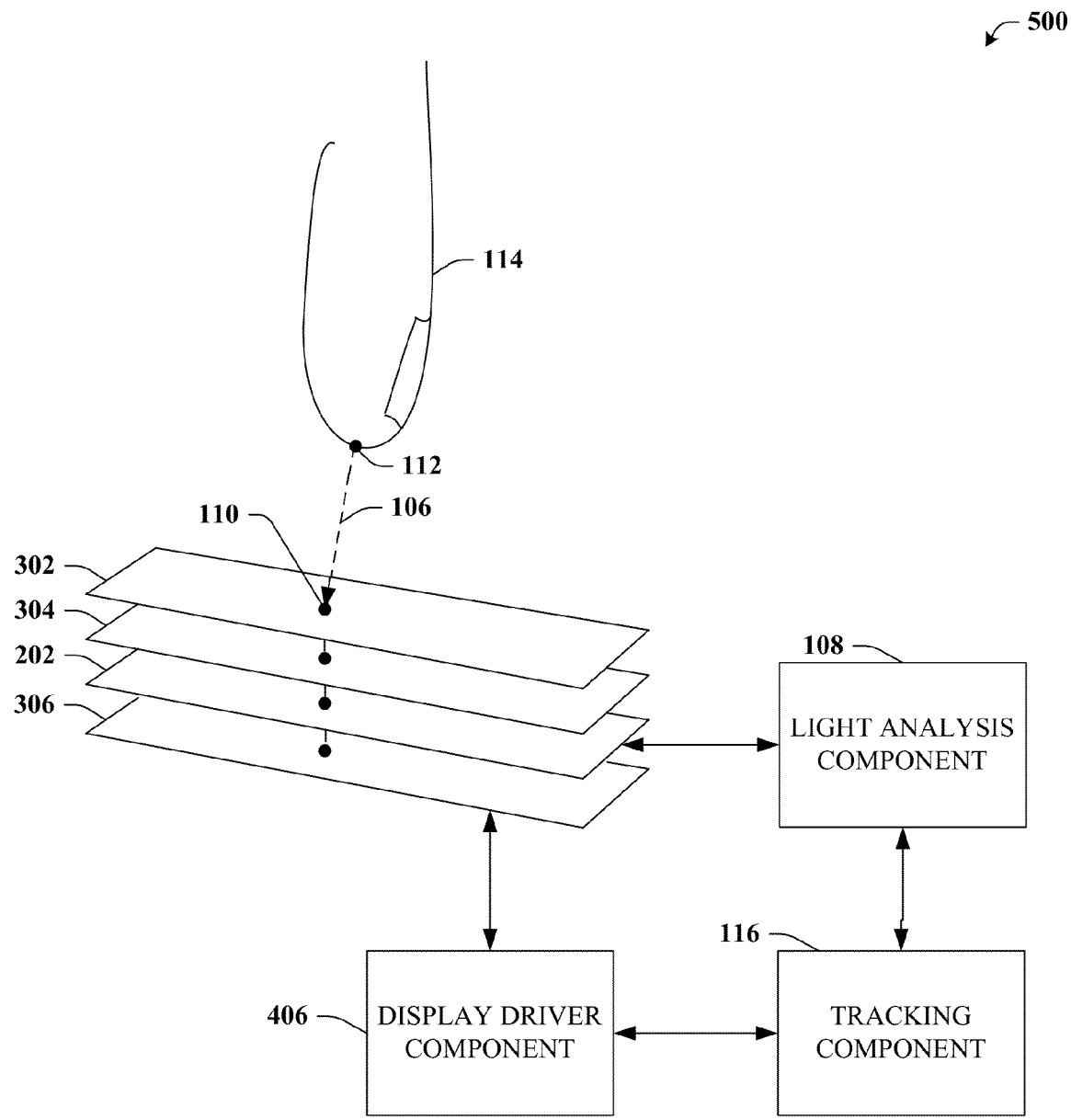
FIG. 5 is a block diagram of a system that can employ photo-sensors to detect a higher intensity area of light emitted by a selector object and that intersects the UI display.

While still referencing FIG. 4, but turning simultaneously to FIG. 5, system 500 that can employ photo-sensors to detect a higher intensity area of light emitted by a selector object and that intersects the UI display is depicted. As previously detailed in connection with FIG. 4, light analysis component 108 can identify shadow 402. Additionally or alternatively, light analysis component 108 can employ similar data obtained by photo-sensors 104 to determine an intersection of infrared light 106 emitted from selector object 114, as illustrated by FIG. 5. Thus, while shadow 402 can be provided by an absence of light 106 in the visible spectrum, the intersection can be based upon higher than average light 106 in the infrared spectrum.

Regardless of the type of light 106 employed or whether shadow 402 or a region of higher intensity is utilized, light analysis component 108 can utilize the location of shadow 402 or the higher intensity region to select or determine location 110. Appreciably, light 106 emitted by selector object 114 will often have a higher intensity directly below position 112 rather than being contingent upon incident angle(s) 204 in the case of a potentially more remote source that produce shadow 402. Accordingly, light analysis component 108 can calculate position 110 in different manners depending upon the type of light 106 being measured and/or based upon incident angle(s) 402. Moreover, light analysis component 108 can interpolate aspects of both visible light readings and infrared light readings to refine coordinate 110 or, in other words, determine a more accurate location for coordinate 110.

Furthermore, as described supra, light analysis component 108 can also employ the data received from the set of photo-sensors 104 to determine incident angle(s) 204 for incoming light or electromagnetic radiation 106. In some aspects, light analysis component 108 can further employ data received from the set of photo-sensors 104 to determine a size or shape of an area with varying intensity (e.g., shadow 402 or the higher intensity intersection region) measurements of the incoming light 106.

In addition, one or both light analysis component 108 or tracking component 116 can determine or infer a variety of other information relating to selector object 114 based upon, e.g., shadow 402 or other data received from the set of photo-sensors 104. For example, the distance between the UI display and selector object 114 can be determined or inferred. Moreover, a size or shape of selector object 114 can be determined or inferred. Based upon all or portions of the determinations or inferences described herein, display driver component 406 can update the UI display in a desired manner, such as updating content 120, implementing the virtual magnifying glass, or the like.

Figure 6:
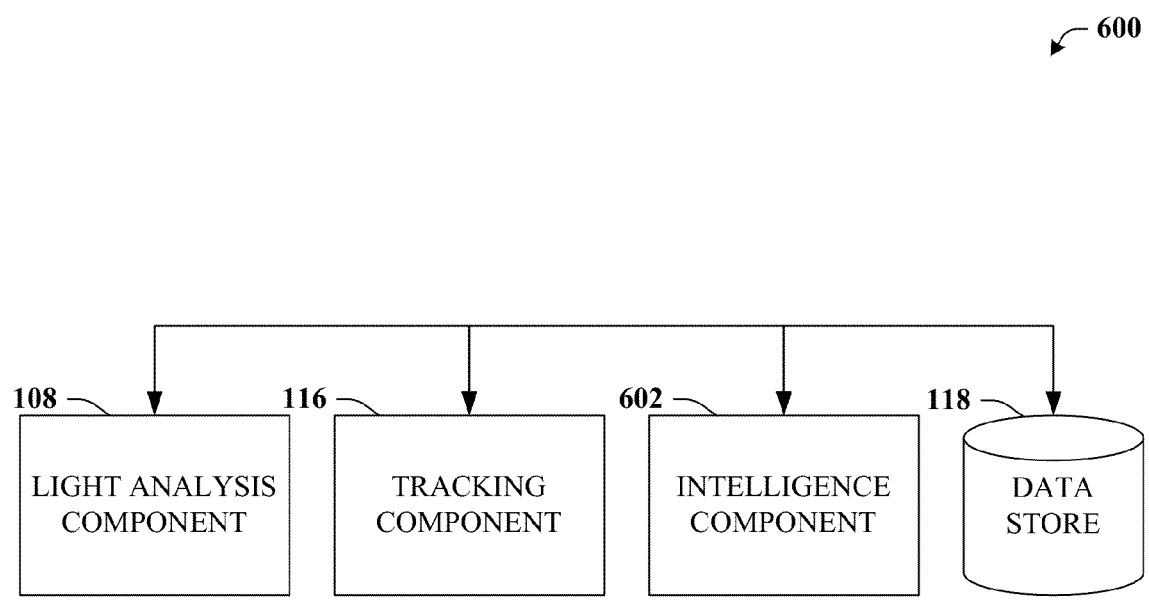
FIG. 6 illustrates a block diagram of a system that can provide or aid in various inferences.

Turning now to FIG. 6, system 600 that can provide or aid in various inferences is illustrated. Typically, system 600 can include light analysis component 108 that can identify coordinate 110 on UI display 102 based upon data received from the set of photo-sensors 104 as substantially described supra. Furthermore, system 600 can also include tracking component 116 that can monitor position 112 of selector object 114 relative to UI display 102, also detailed supra.

In addition, system 600 can also include intelligence component 608 that can provide for or aid in various inferences or determinations. It is to be appreciated that intelligence component 602 can be operatively coupled to all or some of the aforementioned components, e.g., 108 and 116. Additionally or alternatively, all or portions of intelligence component 602 can be included in one or more components described herein. Moreover, intelligence component 602 will typically have access to all or portions of data sets described herein, such as access to data store 118, and can furthermore utilize previously determined or inferred data.

For example, intelligence component 602 can aid light analysis component 108 or tracking component 116 by intelligently determining or inferring the nature of selector object 114. For example, based upon shadow 402, an inference can be made as to the type of object as well as whether or not the object is intended to interact with UI display 102 or merely a random object approaching UI display 102. Moreover, by providing inferences as to the nature of selector object, intelligence component 602 can intelligently determine or infer aspects relating to the size or shape of selector object 114 and/or distance 404 from UI display 102.

In accordance therewith, in order to provide for or aid in the numerous inferences described herein or otherwise suitable, intelligence component 602 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
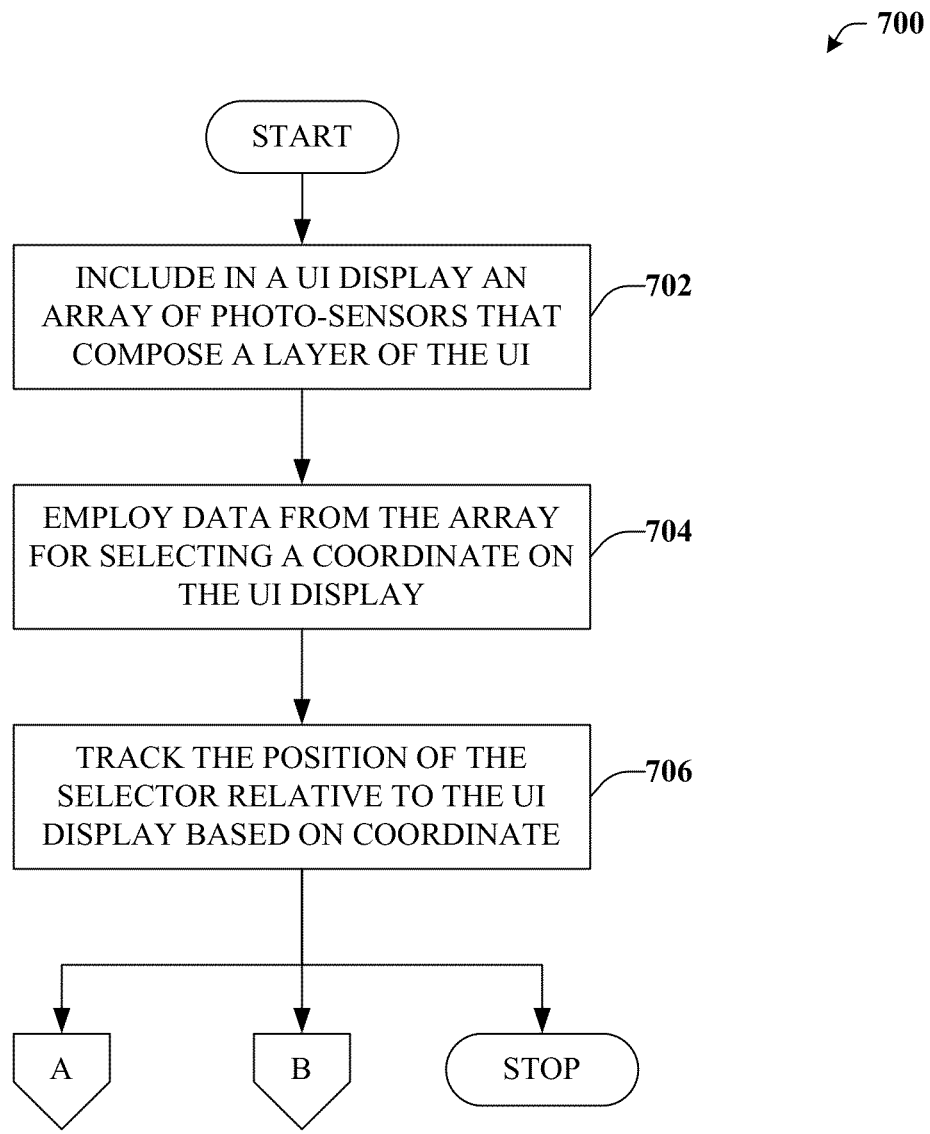
FIG. 7 is an exemplary flow chart of procedures that define a method for employing photo-sensors for tracking approaching or hovering objects with respect to a UI display.
Figure 8:
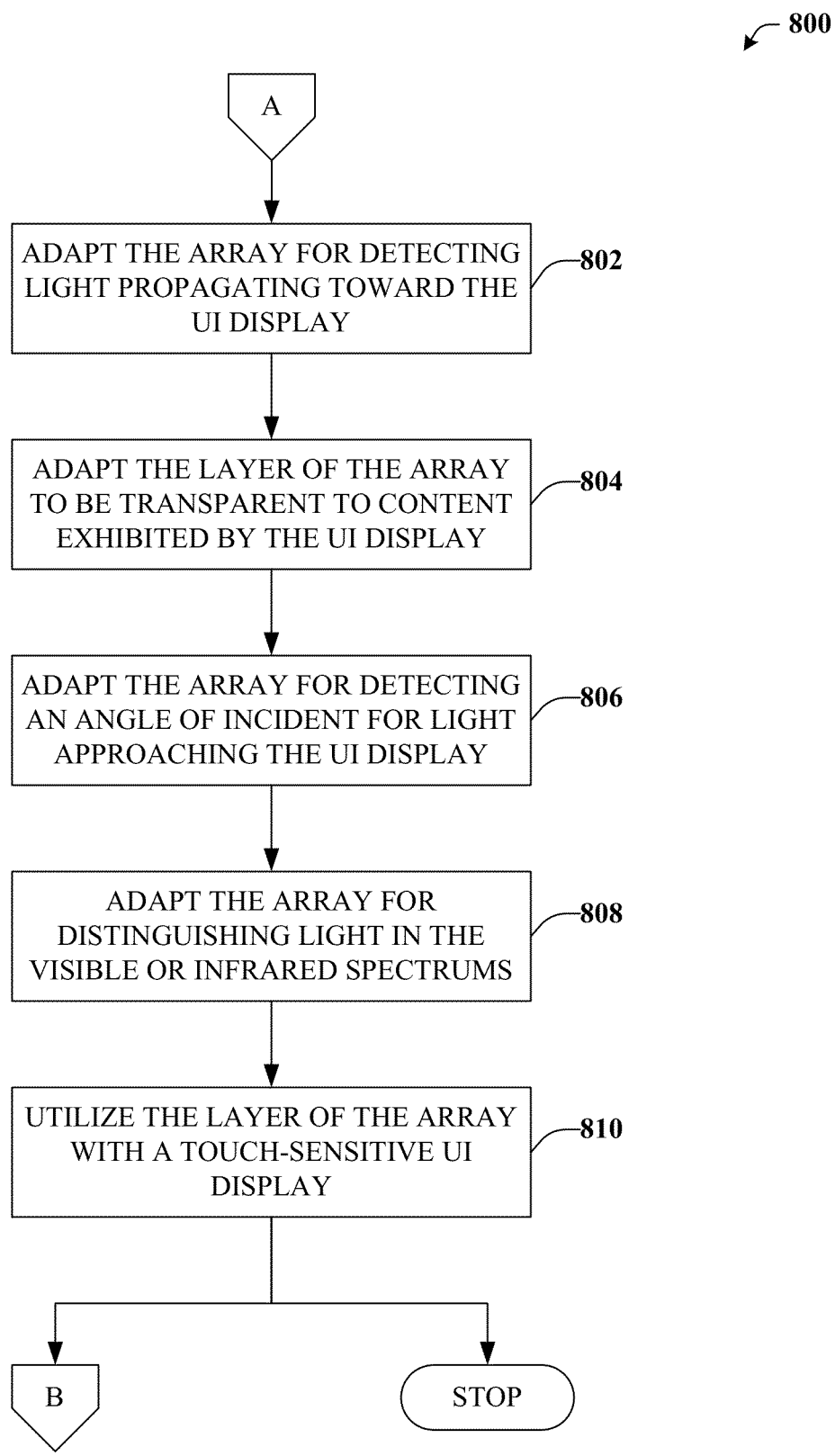
FIG. 8 is an exemplary flow chart of procedures that define a method for configuring features associated with the UI display.
Figure 9:
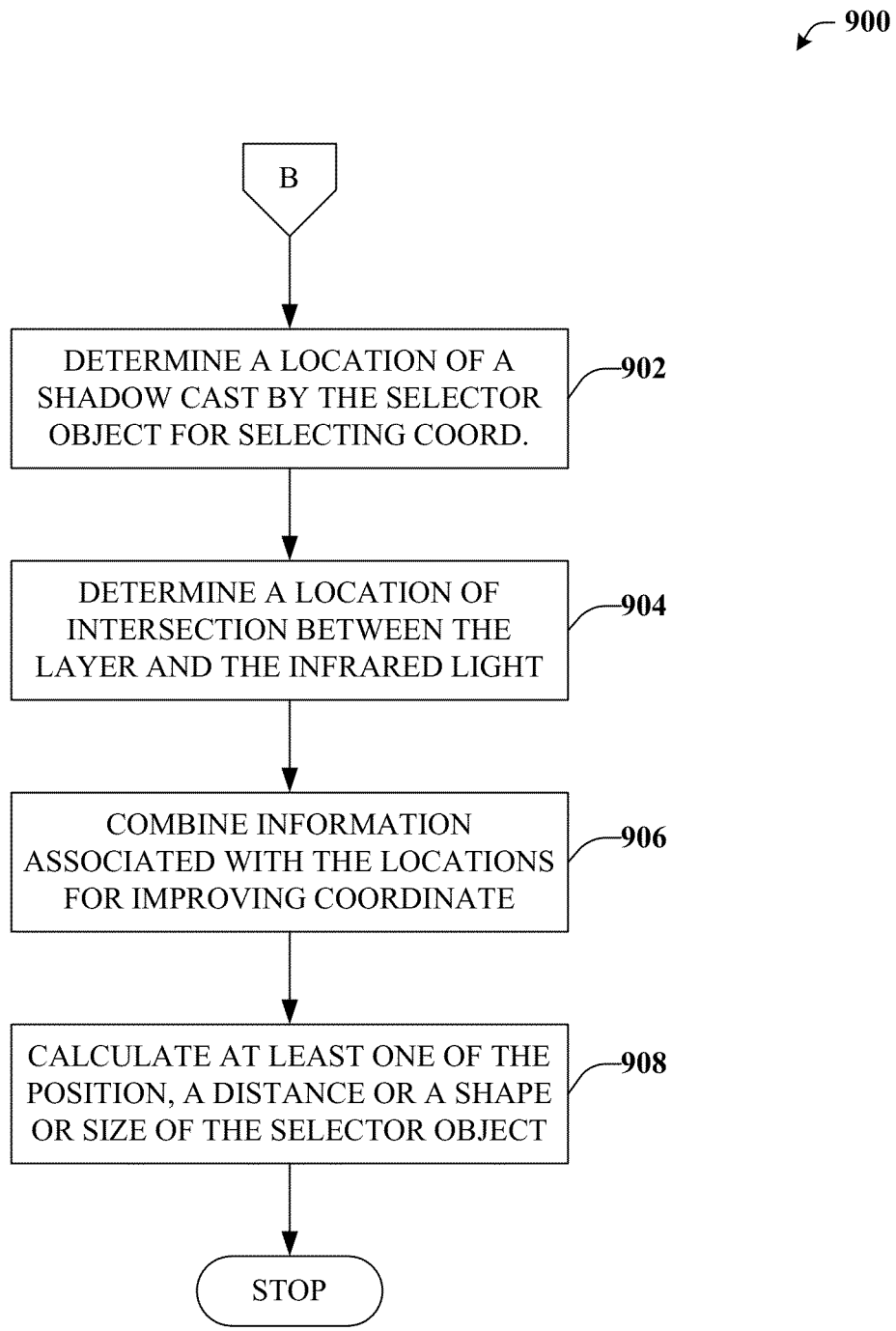
FIG. 9 depicts an exemplary flow chart of procedures defining a method for providing additional features associated with tracking approaching or hovering objects in connection with a UI display.

FIGS. 7, 8, and 9 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 7, exemplary method 700 for employing photo-sensors for tracking approaching or hovering objects with respect to a UI display is depicted. In general, at reference number 702, an array of photo-sensors can be included in a UI display. UI displays often comprise a number of discrete layers, such as a display screen that outputs data, one or more touch-sensitive surfaces, a protective screen, and so forth. Accordingly, the array of photo-sensors can be included in the UI display as one or more distinct layer. Each photo-sensor in the array can detect or measure an intensity of light that strikes or intersects the surface of the photo-sensing layer.

At reference number 704, data received from the array of photo-sensors can be employed for selecting a coordinate on the UI display. For example, the received data can relate to the intensity of incoming light for a particular photo-sensor relative to other photo-sensors in the array. The coordinate selection can be associated with a position of a selector object, which can be determined or inferred from the received data. At reference number 706, the position of the selector object can be tracked relative to the UI display. By monitoring the position of the selector object, updates can be provided to the UI display based upon that position.

With reference now FIG. 8, exemplary method 800 for configuring features associated with the UI display is provided. In accordance therewith, at reference numeral 802, the array of photo-sensors can be adapted for detecting light propagating toward the UI display, while ignoring light propagating away from the UI display. Thus, the array of photo-sensors can be tailored to measure intensity or other characteristics of incoming light, while disregarding light that, e.g., emanates from the UI display when presenting content.

Next to be described, at reference number 804, the one or more layers of the array can be adapted to be substantially transparent to content exhibited by the UI display. It should be understood that, typically, all layers above the display screen, such as the protective surface and the touch-sensing surfaces, can be transparent. This transparency characteristic can apply to the layer including the set of photo-sensors as well to provide an unobstructed view of the display screen.

At reference number 806, the array can be adapted for detecting an angle of incidence for light approaching the UI display. Determining the angle of incidence can be accomplished, for instance, by employing multiple layers of photo-sensors and measuring offsets between the layers. In addition, at reference number 808, the array can be adapted for distinguishing light in the visible spectrum or the infrared spectrum. In other words, the photo-sensors can be specifically tailored for light of particular wavelengths. Moreover, although introduced above, for the sake of completeness it should be understood that at reference number 810, the one or more layers of the array can be utilized with a touch-sensitive UI display (e.g., a display that comprises touch-sensitive layers).

Turning now to FIG. 9, exemplary method 900 for providing additional features associated with tracking approaching or hovering objects in connection with a UI display is depicted. At reference numeral 902, a location of a shadow cast upon the one or more layers by the selector object can be determined for selecting the coordinate on the UI display. In other words, the coordinate selected at reference number 704 of FIG. 7 can be determined by data from the array of photo-sensors that indicate a shadow caused by the selector object. In some cases, the shadow can be used as a proxy for the position of the selector object and the coordinate assigned to the location of the shadow. In other cases, the coordinate can be offset from the shadow based upon the angle of incidence of incoming light as calculated at reference number 806 of FIG. 8.

At reference number 904, a location of intersection between the one or more layers and infrared light emanating from the selector object can be determined. For example, in contrast to the notion of discovering a shadow (generally based upon visible light), certain selector objects, e.g., an operator's finger, emanate infrared light, often at a specific wavelength. Moreover, when propagated directly from the selector object, the intersection of highest intensity often has an incident angle of approximately 90 degrees, and is thus particularly well suited to establish the coordinate.

Regardless, at reference number 906, information associated with the location of the shadow and the location of the intersection can be combined or interpolated for selecting the coordinate. Accordingly, the coordinate can be selected with greater precision than by employing either mechanism alone. At reference number 908, at least one of the position of the selector object, a distance between the UI display and the selector object, or a shape or size of the selector object can be calculated or inferred.

Figure 10:
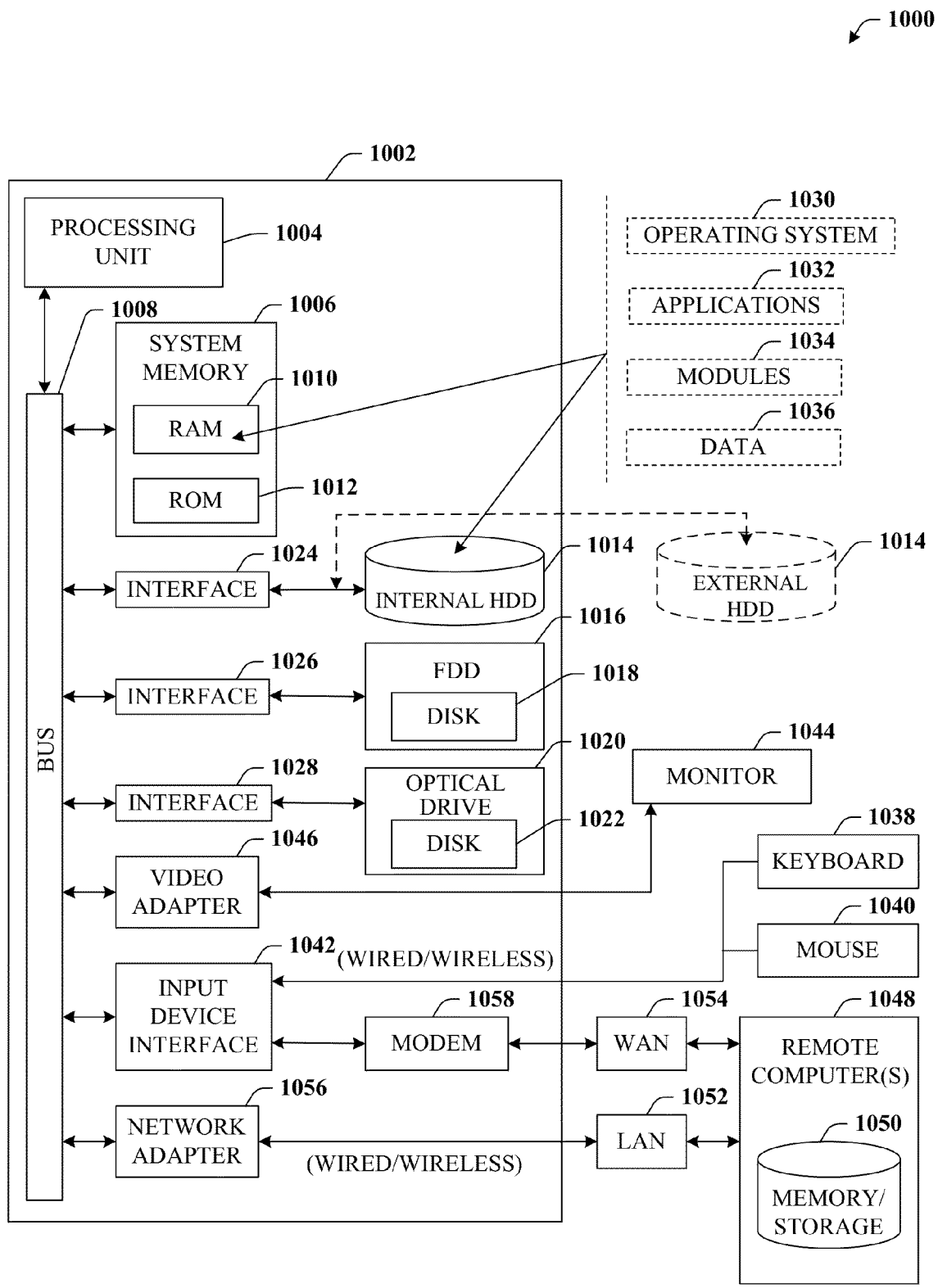
FIG. 10 illustrates a block diagram of a computer operable to execute the disclosed architecture.

Referring now to FIG. 10, there is illustrated a block diagram of an exemplary computer system operable to execute the disclosed architecture. In order to provide additional context for various aspects of the claimed subject matter, FIG. 10 and the following discussion are intended to provide a brief, general description of a suitable computing environment 1000 in which the various aspects of the claimed subject matter can be implemented. Additionally, while the claimed subject matter described above may be suitable for application in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Continuing to reference FIG. 10, the exemplary environment 1000 for implementing various aspects of the claimed subject matter includes a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the claimed subject matter can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11(a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
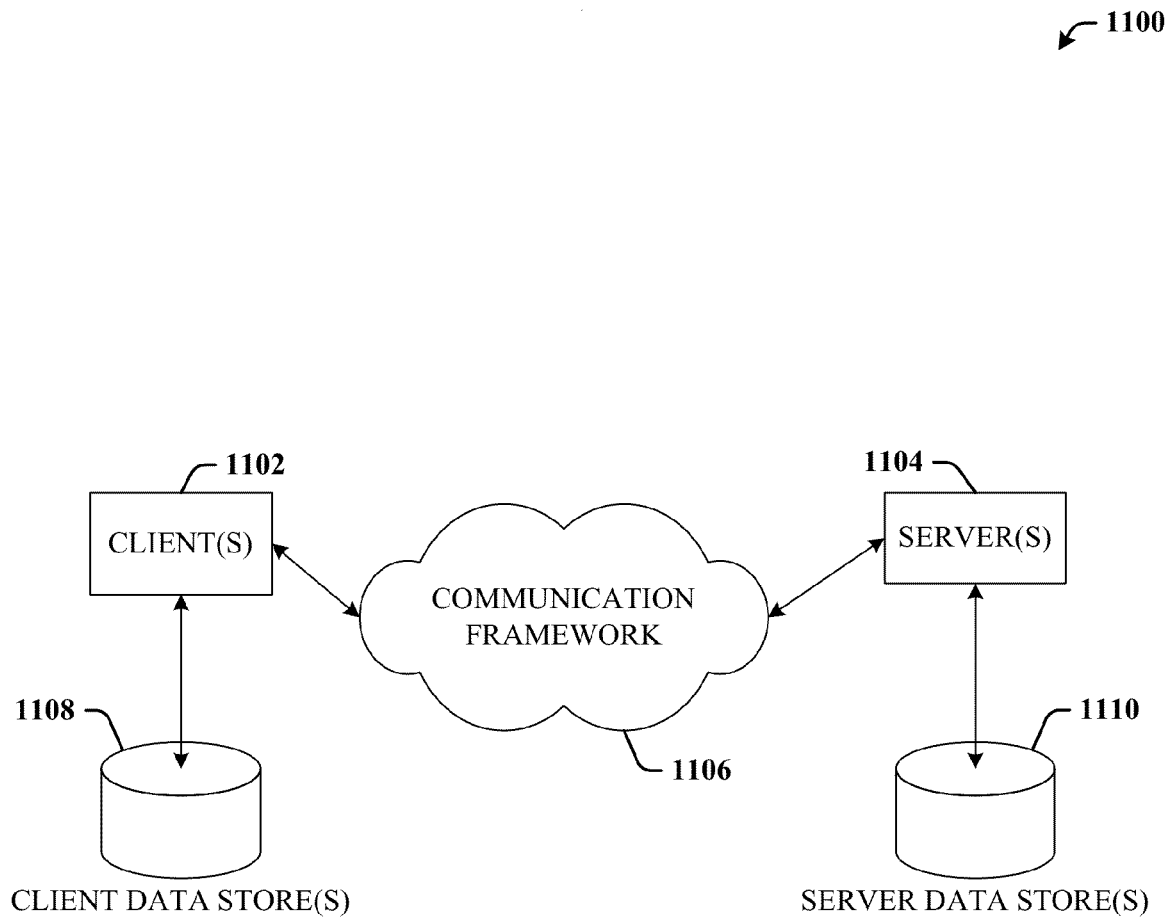
FIG. 11 illustrates a schematic block diagram of an exemplary computing environment.

Referring now to FIG. 11, there is illustrated a schematic block diagram of an exemplary computer compilation system operable to execute the disclosed architecture. The system 1100 includes one or more client(s) 1102. The client(s) 1102 can be hardware and/or software (e.g., threads, processes, computing devices). The client(s) 1102 can house cookie(s) and/or associated contextual information by employing the claimed subject matter, for example.

The system 1100 also includes one or more server(s) 1104. The server(s) 1104 can also be hardware and/or software (e.g., threads, processes, computing devices). The servers 1104 can house threads to perform transformations by employing the claimed subject matter, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A display device, comprising:
    a protection layer that covers a portion of the display device;
    a display layer to present content; and
    a sensing layer that is situated between the protection layer and the display layer, wherein the sensing layer comprises a set of photo sensors to sense electromagnetic radiation from a source other than the display layer.

2. The display device of claim 1, further comprising a touch-sensitive layer that is situated between the protection layer and the display layer.

3. The display device of claim 2, wherein the touch-sensitive layer detects contact with the display device.

4. The display device of claim 1, wherein the sensing layer is transparent.

5. The display device of claim 1, wherein the sensing layer comprises sub-layers, wherein a sub-layer of the sub-layers comprises a subset of the set of photosensors.

6. The display device of claim 5, wherein the set of photosensors are configured to measure an angle of the electromagnetic radiation with respect to the sensing layer.

7. The display device of claim 1, wherein the set of photosensors are configured to measure an intensity of the electromagnetic radiation.

8. The display device of claim 1, further comprising:
a memory to store executable instructions; and
a processor, coupled to the memory, that facilitates execution of the executable instructions to perform operations, comprising:
determining a location of a selection object relative to the display device based on data received from the set of photosensors.

9. The display device of claim 8, wherein the operations further comprise transforming the location of the selection object to a screen coordinate associated with the display device based on the data received from the set of photosensors.

10. The display device of claim 9, wherein the location of the selection object is represented as a three-dimensional location and the screen coordinate associated with the display device is represented as a two-dimensional coordinate.

11. A non-transitory computer readable storage device comprising executable instructions that, in response to execution, cause a system comprising a processor to perform operations, comprising:
receiving angle data indicative of an angle associated with electromagnetic radiation that is sensed by a photosensor included in a display device;
receiving intensity data indicative of an intensity of the electromagnetic radiation sensed by the photosensor;
determining a location of an object proximal to the display device based on the angle data and the intensity data; and
mapping the location of the object to a screen coordinate associated with the display device based on the angle data and the intensity data.

12. The computer readable storage device of claim 11, wherein the electromagnetic radiation originates from a source that is remote from the display device.

13. The computer readable storage device of claim 12, wherein the object is between the display device and the source, and the source of the electromagnetic radiation is determined to be at a greater distance from the display device than the object.

14. The computer readable storage device of claim 11, wherein the electromagnetic radiation has a wavelength in a range of about 300 nanometers to about 800 nanometers.

15. The computer readable storage device of claim 11, wherein the electromagnetic radiation has a wavelength in a range of about 800 nanometers to about one millimeter.

16. The computer readable storage device of claim 15, wherein the electromagnetic radiation originates from the object.

17. A method, comprising:
receiving, by a system including a processor and a set of sensors, electromagnetic radiation that propagates to the set of sensors from a source remote from the system;
storing, by the system, data sensed by the set of sensors that relates to an angle of electromagnetic radiation relative to the set of sensors and an intensity of the electromagnetic radiation; and
determining, by the system, a location of a selector object relative to the set of sensors based on the data.

18. The method of claim 17, further comprising determining, by the system, a screen coordinate of a display of the system based on the data, wherein the screen coordinate maps to the location of the selector object.

19. The method of claim 18, further comprising discarding, by the system, a second portion of the data that is associated with electromagnetic radiation that emanates from the display.

20. The method of claim 17, wherein a first portion of the data is associated with electromagnetic radiation that originates from the source that is remote from the system.

* * * * *